United States Patent
Gomadam et al.

(10) Patent No.: US 10,044,487 B2
(45) Date of Patent: Aug. 7, 2018

(54) INTERFERENCE MANAGEMENT IN WIRELESS MULTI-ACCESS COMMUNICATION NETWORKS

(71) Applicant: Avago Technologies General IP (Singapore) Pte. Ltd., Singapore (SG)

(72) Inventors: Krishna Srikanth Gomadam, San Jose, CA (US); Djordje Tujkovic, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 683 days.

(21) Appl. No.: 14/093,093

(22) Filed: Nov. 29, 2013

(65) Prior Publication Data

US 2014/0153510 A1   Jun. 5, 2014

Related U.S. Application Data (60) Provisional application No. 61/732,200, filed on Nov. 30, 2012.

(51) Int. Cl.
*H04L 5/00*   (2006.01)
*H04B 7/024*   (2017.01)
(Continued)

(52) U.S. Cl.
CPC ........... *H04L 5/0073* (2013.01); *H04B 7/024* (2013.01); *H04B 7/0456* (2013.01); *H04B 7/0634* (2013.01); *H04B 7/0639* (2013.01)

(58) Field of Classification Search
CPC .................................................... H04L 5/0073
See application file for complete search history.

(56) References Cited

U.S. PATENT DOCUMENTS 8,611,448 B2 * 12/2013 Erell .................... H04B 7/0417
375/219
2009/0110114 A1   4/2009 Onggosanusi et al.
(Continued)

FOREIGN PATENT DOCUMENTS

CN   101272170 A   9/2008
CN   101400139 A   4/2009
(Continued)

OTHER PUBLICATIONS

European Search Report directed at related European Patent Application No. 13005589.0, dated Mar. 7, 2014, Munich, Germany; 5 pages.
"Multi-Cell PMI Coordination for Downlink CoMP," 3rd Generation Partnership Project (3GPP) TSG RAN WG1 Meeting #58bis, Miyazaki, Japan, Oct. 12-16, 2009; 4 pages.
(Continued)

*Primary Examiner* — John Blanton
(74) *Attorney, Agent, or Firm* — Sterne, Kessler, Goldstein & Fox P.L.L.C.

(57) ABSTRACT

Embodiments provide systems and methods for interference management in wireless multi-access communication networks, and more particularly systems and methods to enable reduction and/or suppression of interference. Embodiments for interference reduction include, without limitation, systems and methods to enable interference alignment, interference avoidance, and/or joint transmission to a user equipment (UE). Embodiments for enabling suppression of interference include, without limitation, systems and methods for feedback (from a UE to a network) or feedforward (from the network to the UE) signaling to enable interference estimation at the network/UE.

20 Claims, 8 Drawing Sheets

(51) Int. Cl.
*H04B 7/0456* (2017.01)
*H04B 7/06* (2006.01)

(56) References Cited

U.S. PATENT DOCUMENTS

| | | | |
|---|---|---|---|
| 2010/0234071 A1 | 9/2010 | Shabtay et al. | |
| 2010/0322176 A1 | 12/2010 | Chen et al. | |
| 2011/0206106 A1* | 8/2011 | Mallik | H04B 7/024 375/226 |
| 2012/0002635 A1* | 1/2012 | Chung | H04L 5/0035 370/329 |
| 2012/0082128 A1 | 4/2012 | Kent et al. | |

FOREIGN PATENT DOCUMENTS

| | | |
|---|---|---|
| CN | 101902304 A | 12/2010 |
| CN | 101931993 A | 12/2010 |
| CN | 102075300 A | 5/2011 |

OTHER PUBLICATIONS

"Further Discussion on Inter-Cell Interference Mitigation through Limited Coordination," 3$^{rd}$ Generation Partnership Project (3GPP) TSG RAN WG1 Meeting #55, Prague, Czech Republic, Nov. 10-14, 2008; 11 pages.

"Considerations on the Selection Method for CoMP Cell," 3$^{rd}$ Generation Partnership Project (3GPP) TSG RAN WG1 Meeting #57, San Francisco, USA, May 4-8, 2009; 3 pages.

Li, et al., "Differential Precoding Scheme of LTE Systems over Temporally Correlated Channels," Vehicular Technology Conference, IEEE, Sep. 5, 2011; 5 pages.

Chinese Office Action and Search Report directed to related App. No. CN 201310637376.9, dated Jun. 1, 2016; 9 pages.

English-language abstract of App. No. CN 101400139 A, published Apr. 1, 2009; 1 page.

English-language abstract of App. No. CN 101902304 A, published Dec. 1, 2010; 1 page.

English-language abstract of App. No. CN 101931993 A, published Dec. 29, 2010; 1 page.

English-language abstract of App. No. CN 102075300 A, published May 25, 2011; 1 page.

\* cited by examiner

INTERFERENCE MANAGEMENT IN WIRELESS MULTI-ACCESS COMMUNICATION NETWORKS

CROSS-REFERENCE TO RELATED APPLICATION(S)

The present application claims the benefit of U.S. Provisional Application No. 61/732,200, filed Nov. 30, 2012, which is incorporated herein by reference in its entirety.

TECHNICAL FIELD

The present disclosure relates generally to interference management in wireless multi-access communication networks, and more particularly to systems and methods to enable reduction and/or suppression of interference.

BACKGROUND

Background Art

Interference management is significantly important for future cellular communications systems. Typical interference management approaches rely on coordination between base stations in the network and knowledge of full channel state information (CSI) at the network side. In practice, obtaining the full CSI at the network side can consume significant resources as a large amount of information would need to be signaled from the user equipments (UEs) to their serving base stations and also in between base stations.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
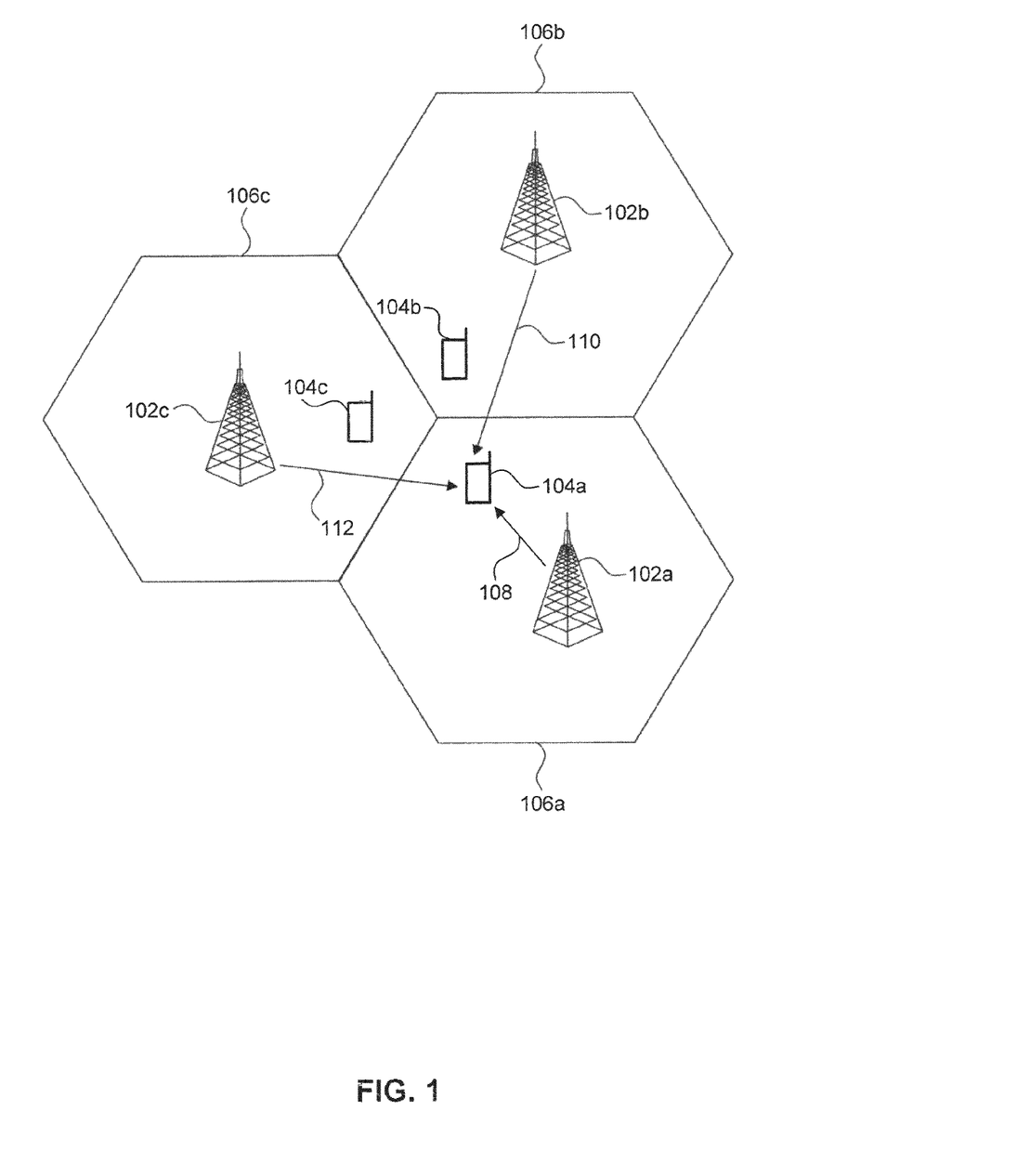
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 illustrates a multi-access communication network, which may be a cellular network. The cellular network can operate using existing 3G/4G cellular technology standards (e.g., Long Term Evolution (LTE), Wideband Code Division Multiple Access (WCDMA), WiMAX, etc.) or future 5G cellular technology standards (e.g., LTE-Advanced).

As shown in FIG. 1, example environment 100 includes, without limitation, three cellular regions 106a, 106b, and 106c, being served respectively by base stations (cells) 102a, 102b, and 102c. As would be understood by a person of skill in the art, regions 106a, 106b, and 106c are shown as hexagons for the purpose of illustration only, and in practice, cells 102a, 102b, and 102c have non-uniform and varying coverage regions.

For the purpose of illustration only, it is assumed that cells 102a, 102b, and 102c serve user equipments (UEs) 104a, 104b, and 104c respectively. In an embodiment, UE 104 is at the edge of region 106a, such that UE 104a receives, in addition to a desired signal 108 from cell 102a, first and second interfering signals 110 and 112 from cells 102b and 102c respectively. Without coordination among cells 102a, 102b, and 102c, interfering signals 110 and 112 can degrade the ability of UE 104a to receive desired signal 108.

In an embodiment, the received signal (y) at UE 104a can be described mathematically as:

$$y = H_1 W_1 x_1 + H_2 W_2 x_2 + H_3 W_3 x_3 + n \tag{1}$$

where $x_1$, $x_2$, and $x_3$ denote the transmitted signals of cells 102a, 102b, and 102c respectively; $W_1$, $W_2$, and $W_3$ denote precoders applied by cells 102a, 102b, and 102c to their respective transmitted signals; $H_1$, $H_2$, and $H_3$ denote channel estimates of the downlink channels from cells 102a, 102b, and 102c to UE 104a respectively; and n denotes noise and inter-cell interference at UE 104a.

In general, UE 104a can demodulate the transmitted signal $x_1$ (corresponding to desired signal 108) at high performance with knowledge of an interference covariance matrix. With reference to the received signal model above, the interference covariance matrix can be described mathematically as:

$$Q = H_2 W_2 W_2^* H_2^* + H_3 W_3 W_3^* H_3^* + I \tag{2}$$

where I represents an identity matrix, and * represents a conjugate operator.

However, in practice, UE 104a is unable to compute an accurate estimate of the interference covariance matrix Q. This is because, in a typical cellular network, interference is highly variable and often unpredictable from one time/frequency allocation to another. Further, the minimum time/frequency allocation granularity contains a low number of resource elements (e.g., a physical resource block (PRB) in LTE contains only 12 tones and 7 Orthogonal Frequency Division Multiplexing (OFDM) symbols), only a few of which carry pilot tones that can be used for interference covariance estimation. Accordingly, UE 104a cannot perform sufficient interference covariance measurements to determine an accurate estimate of the interference covariance matrix Q before interference varies, and can suffer considerable demodulation performance degradation by using a poor estimate of the interference covariance matrix Q.

Embodiments, as further described below, provide systems and methods for interference management in wireless multi-access communication networks, and more particularly systems and methods to enable reduction and/or suppression of interference. Embodiments for interference reduction include, without limitation, systems and methods to enable interference alignment, interference avoidance, and/or joint transmission to a UE. Embodiments for enabling interference suppression include, without limitation, systems and methods for feedback (from a UE to the network) or feedforward (from the network to the UE) signaling to enable interference estimation (e.g., estimation of the interference covariance matrix) at the network/UE.

Figure 2:
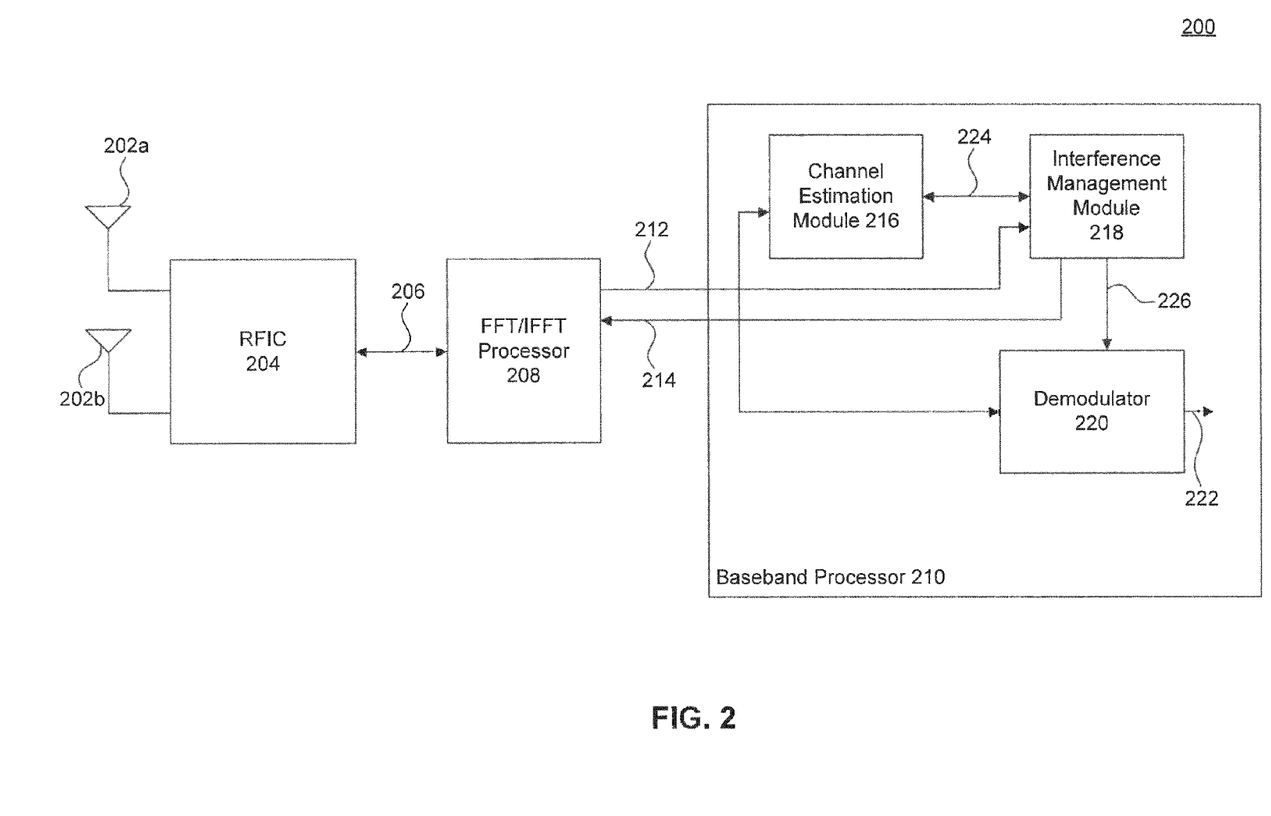
FIG. 2 illustrates an example user equipment (UE) in which embodiments can be implemented or practiced.

FIG. 2 illustrates an example user equipment (UE) 200 in which embodiments can be implemented or practiced. Example UE 200 is provided for the purpose of illustration only and is not limiting of embodiments. Example UE 200 can be an embodiment of UE 104a, for example. As shown in FIG. 2, example UE 200 includes, without limitation, a plurality of antennas 202a-b, a radio frequency integrated circuit (RFIC) 204, a Fast Fourier Transform (FFT)/Inverse FFT (IFFT) processor 208, and a baseband processor 210. In another embodiment, FFT/IFFT processor 208 can be implemented within baseband processor 210. Baseband processor 210 includes, without limitation, a channel estimation module 216, an interference management module 218, and a demodulator 220.

In an embodiment, example UE 200 can receive transmissions from one or more cells using antennas 202a-b. In other embodiments, UE 200 can have more or less than two antennas. The signals received by antennas 202a and 202b are processed by RFIC 204, which may filter, down-convert, and digitize the received signals and then provide the signals in the form of baseband signals to FFT/IFFT processor 208 via an interface 206. In embodiments, the received signals can include a desired signal from a serving cell of UE 200 (the serving cell is a cell that transmits a signal intended to the UE) and/or one or more signals from one or more other cells. The one or more other cells can be serving cells or non-serving (interfering) cells. The desired signal and/or the one or more other signals can include data, pilot, and/or control (signaling) information from the respective cells.

FFT/IFFT processor 208 processes the baseband signals from RFIC 204 to generate an information signal 212. In an embodiment, information signal 212 is provided to channel estimation module 216, interference management module 218, and demodulator 220.

In an embodiment, channel estimation module 216 can process information signal 212 to generate estimate(s) of downlink channel(s) from the serving cell and/or any present interfering cells. For example, channel estimation module 216 can generate estimates corresponding to the terms $H_1$, $H_2$, and $H_3$ described in equation (1) above when used in example environment 100. In an embodiment, channel estimation module 216 provides generated channel estimates by means of an output signal 224 to interference management module 218.

In an embodiment, as further described below with reference to FIGS. 3-5, interference management module 218 is configured to compute precoders (precoder matrix indicators (PMIs)) for the serving cell and/or any present interfering cells based on the channel estimates contained in output signal 224. In another embodiment, as further described below with reference to FIG. 6, interference management module 218 is configured to select, based on the channel estimates contained in output signal 224, a cell combination from the serving cell and any present interfering cells to participate in joint transmission to UE 200 (in joint transmission, all participating cells transmit the same desired signal to the UE); and to determine a joint PMI for use by the selected cell combination in transmission to UE 200. In a further embodiment, as described below with reference to FIG. 7, interference management module 218 is configured to decompose an estimate of the downlink channel from the serving cell (or another cell) to generate a left singular matrix and to form a quantized left singular matrix for signaling to the network (the network can use the quantized left singular matrix to determine the precoders for the serving cell and/or any present interfering cells).

In an embodiment, interference management module 218 is configured to output a signal 214 to FFT/IFFT processor 208. Signal 214 can include the computed PMIs, the selected cell combination, the joint PMI, and/or the quantized left singular matrix for signaling to the network. Signal 214 is processed by FFT/IFFT processor 208 and RFIC 204 and then transmitted by the plurality of antennas 202a-b to a network entity (e.g., the serving cell).

In another embodiment, as further described below with reference to FIG. 8, interference management module 218 is configured to receive an interference correlation matrix index from a network entity (e.g., the serving cell) via information signal 212 and to compute an interference covariance matrix based on the interference correlation matrix index. In an embodiment, the interference correlation matrix index indicates the interference covariance matrix from a codebook available at UE 200 as described below. Interference management module 218 provides the interference covariance matrix by means of a signal 226 to demodulator 220. Using the interference covariance matrix, demodulator 220 can demodulate the desired signal from the serving cell to generate a demodulated desired signal 222.

FIGS. 3-8 illustrate example processes according to embodiments. These example processes are provided for the purpose of illustration only and are not limiting of embodiments. For the purpose of illustration, the example processes are described with reference to example environment 100 and example UE 200.

Figure 3:
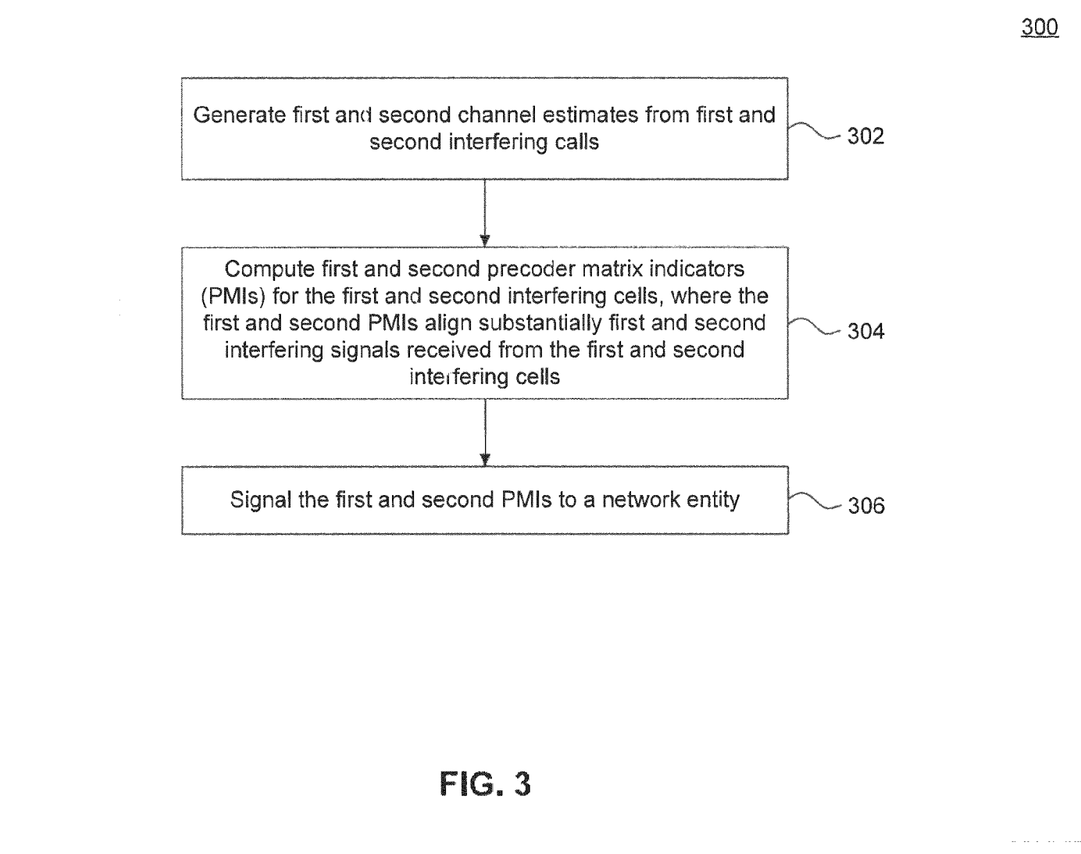
FIGS. 3-8 illustrate example processes according to embodiments.

FIG. 3 illustrates an example process 300 for enabling alignment of interference at UE 200. Example process 300 exploits the fact that the UE is better equipped than the network to estimate the downlink channels from the serving cell and any present interfering cells, and as such can determine better downlink transmission precoders than the network. Example process 300 also avoids having the UE signal the downlink channel estimates to the network, which can result in a large signaling overhead.

As shown in FIG. 3, process 300 begins in step 302, which includes generating first and second channel estimates from first and second interfering cells. With reference to example environment 100, for example, the first and second channel estimates from the first and second interfering cells correspond to the terms $H_2$ and $H_3$ in equation (1) described above. As would be understood by a person of skill in the art, more than two channel estimates can be generated when more than two strong interfering cells are present. In an embodiment, step 302 is performed by a channel estimation module, such as channel estimation module 216.

Process 300 then proceeds to step 304, which includes computing first and second precoder matrix indicators (PMIs) for the first and second interfering cells respectively based on the first and second channel estimates, where the first and second PMIs substantially align first and second interfering signals received from the first and second interfering cells. By aligning the first and second interfering signals along one receive direction, a desired signal from the serving cell can be received in another (e.g., orthogonal) receive direction with no or minimal interference. With reference to example environment 100, for example, the first and second PMIs correspond respectively to the terms $W_2$ and $W_3$ in equation (1) described above, and the first and second interfering signals correspond respectively to the terms $H_2W_2x_2$ and $H_3W_3x_3$ in equation (1). In an embodiment, step 304 is performed by an interference management module, such as interference management module 218.

In an embodiment, process 300 further includes selecting the first and second interfering cells from multiple available cells. For example, if more than two interfering cells are present, the interference management module can determine which two of the multiple available cells to align interference from. In an embodiment, the interference management module determines for all possible two-cell combinations the potential interference alignment that can be achieved and selects the two cells for which interference can be best aligned.

In an embodiment, the alignment of the interference from two cells is performed by selecting the first and second PMIs to satisfy:

$$H_2W_2 = cH_3W_3 \quad (3)$$

where $H_2$ and $H_3$ denote the first and second channel estimates respectively, $W_2$ and $W_3$ denote the first and second PMIs, and c is a complex constant.

In another embodiment, the interference management module is configured to select the first and second PMIs from a finite set of PMIs such that:

$$(i^{opt}, j^{opt}) = \arg\max_{i,j}\left\langle \frac{H_2W_i}{\|H_2W_i\|}, \frac{H_3W_j}{\|H_3W_j\|} \right\rangle \quad (4)$$

where $i^{opt}$ and $j^{opt}$ correspond respectively to indices (from the finite set of PMIs) of the selected first and second PMIs, $H_2$ corresponds to the first channel estimate from the first interfering cell, $H_3$ corresponds to the second channel estimate from the second interfering cell, $W_i$ corresponds to the first PMI, and $W_j$ corresponds to the second PMI, and $\langle \rangle$ denotes a dot-product operation. The first and second PMIs selected according to equation (4) represent two PMIs from the finite set of PMIs that best meet equation (3). In other words, the first and second PMIs selected according to equation (4) cause the first and second interfering signals to have receive directions that are as close as possible.

Process 300 terminates in step 306, which includes signaling the first and second PMIs to a network entity (e.g., serving cell or an interfering cell). In an embodiment, the first and second PMIs are signaled on an uplink control channel to one of the available cells (e.g., the serving cell). In an embodiment, step 306 is performed by antennas 202*a-b*.

Figure 4:
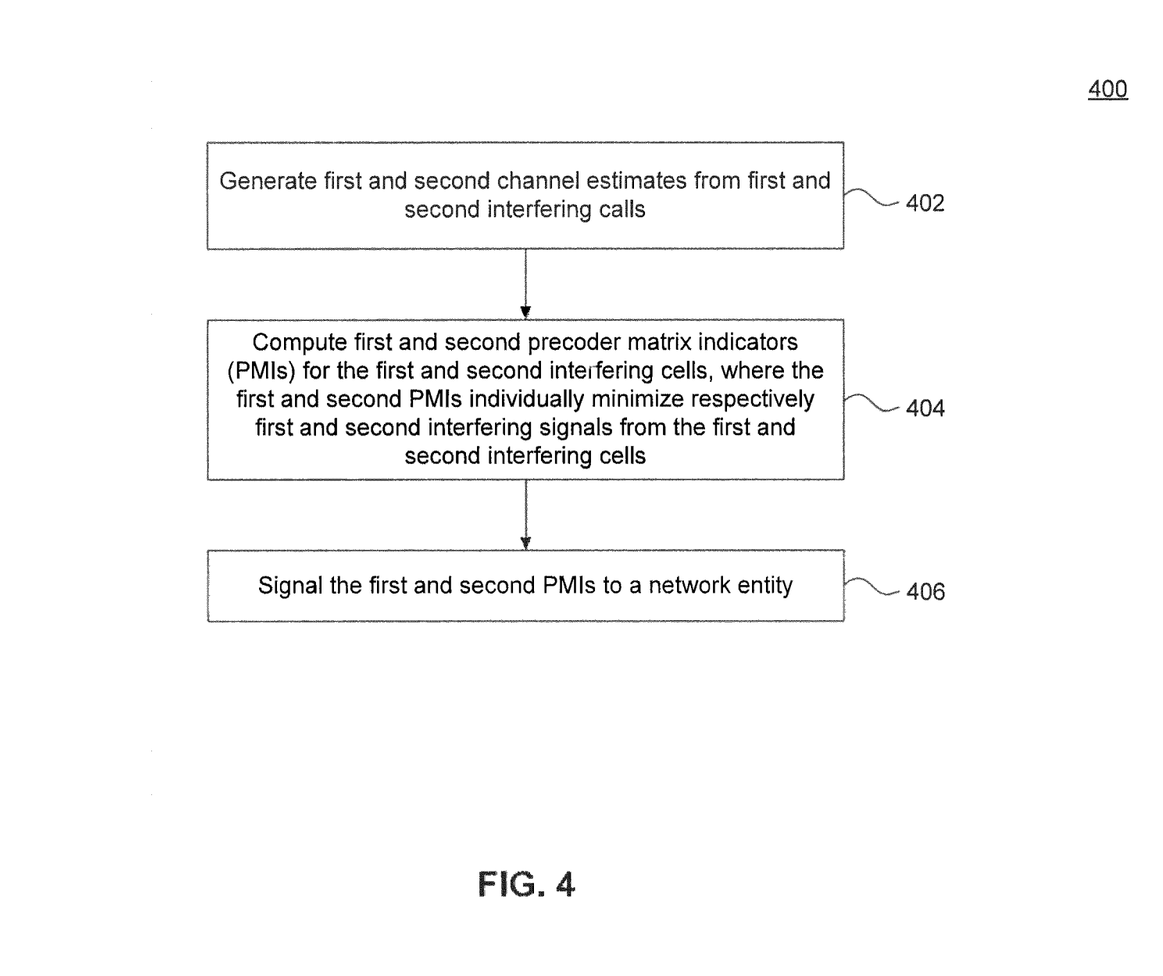

FIG. 4 illustrates an example process 400 for interference avoidance at UE 200. Example process 400 again exploits the fact that the UE is better equipped than the network to estimate the downlink channels from the serving cell and any present interfering cells, and as such can determine better downlink transmission precoders than the network.

Example process 400 also avoids having the UE signal the downlink channel estimates to the network, which can result in a large signaling overhead.

As shown in FIG. 4, process 400 begins in step 402, which includes generating first and second channel estimates from first and second interfering cells. With reference to example environment 100, for example, the first and second channel estimates from the first and second interfering cells correspond to the terms $H_2$ and $H_3$ in equation (1) described above. As would be understood by a person of skill in the art, more than two channel estimates can be generated when more than two strong interfering cells are present. In an embodiment, step 402 is performed by a channel estimation module, such as channel estimation module 216.

Process 400 then proceeds to step 404, which includes computing first and second precoder matrix indicators (PMIs) for the first and second interfering cells respectively based on the first and second channel estimates, where the first and second PMIs individually minimize/reduce respectively first and second interfering signals from the first and second interfering cells. In an embodiment, step 404 is performed by an interference management module, such as interference management module 218.

In an embodiment, the interference management module individually minimizes interference from the first and/or second interfering cells by selecting the first and/or second PMIs from a finite set of PMIs according to:

$$i^{opt}(j) = \arg\min_i \|H_jW_i\|^2, \quad j = 2, 3 \quad (5)$$

where $i^{opt}(j)$ corresponds to an index (from the finite set of PMIs) of the selected first/second PMI, $H_j$ corresponds to first/second channel estimate, and $W_i$ corresponds to the first/second PMI.

Process 400 terminates in step 406, which includes signaling the first and second PMIs to a network entity. In an embodiment, the first and second PMIs are signaled on an uplink control channel to one of the available cells (e.g., the serving cell). In an embodiment, step 406 is performed by antennas 202*a-b*.

Figure 5:
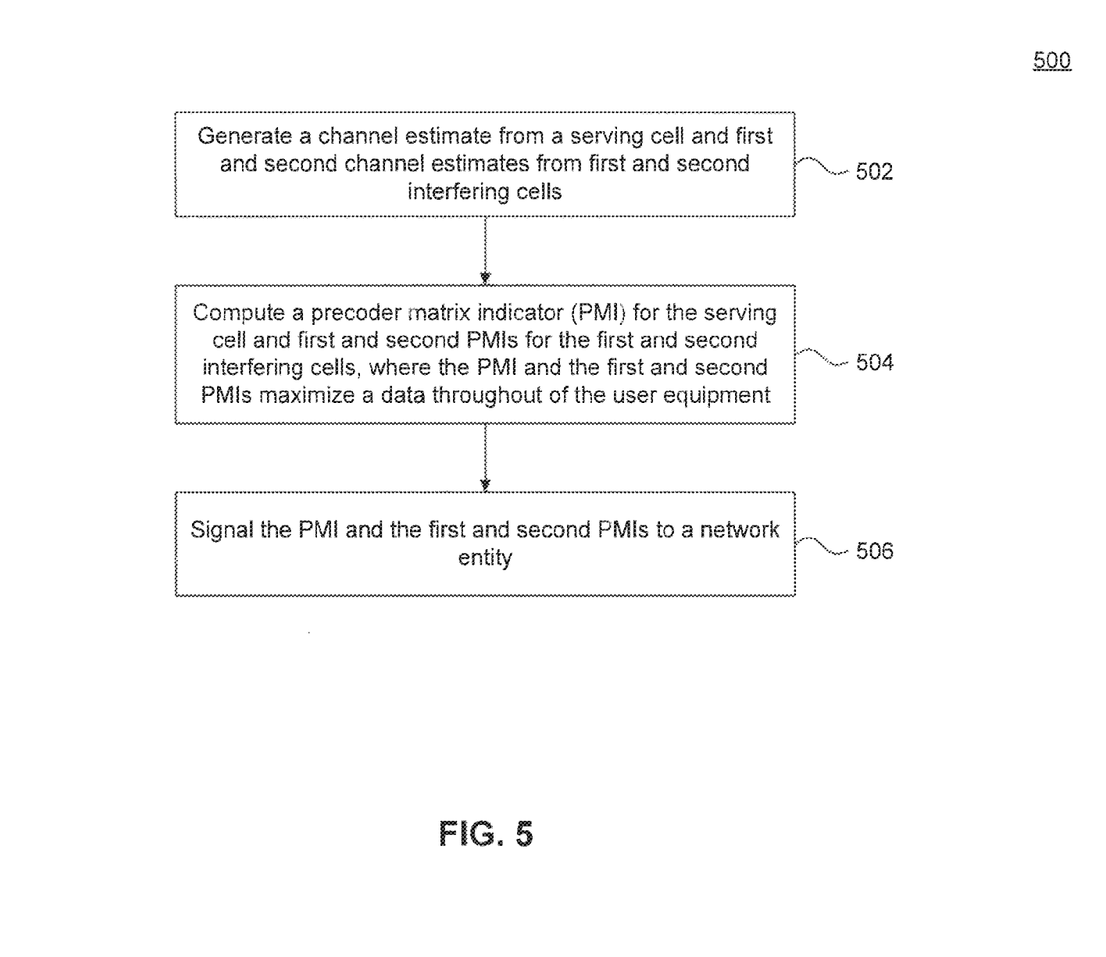

FIG. 5 illustrates another example process 500 for interference avoidance at UE 200. Example process 500 again exploits the fact that the UE is better equipped than the network to estimate the downlink channels from the serving cell and any present interfering cells, and as such can determine better downlink transmission precoders than the network. Example process 500 also avoids having the UE signal the downlink channel estimates to the network, which can result in a large signaling overhead.

As shown in FIG. 5, process 500 begins in step 502, which includes generating a channel estimate from a serving cell and first and second channel estimates from first and second interfering cells. With reference to example environment 100, for example, the channel estimate from the serving cell corresponds to the term $H_1$ and the first and second channel estimates from the first and second interfering cells correspond to the terms $H_2$ and $H_3$ in equation (1) described above. In an embodiment, step 502 is performed by a channel estimation module, such as channel estimation module 216.

Process 500 then proceeds to step 504, which includes computing a precoder matrix indicator (PMI) for the serving cell and first and second PMIs for the first and second interfering cells, where the PMI and the first and second PMIs increase/maximize a data throughput of UE 200. In an embodiment, step 504 is performed by an interference management module, such as interference management module 218.

In an embodiment, the interference management module is configured to select the PMI and the first and second PMIs from a finite PMI set according to:

$$(i^{opt}, j^{opt}, k^{opt}) = \arg\max_{i,j,k} \log\det(I + H_1 W_i W_i^* H_1^* (H_2 W_j W_j^* H_2^* + H_3 W_k W_k^* H_3^* + I)^{-1}) \quad (6)$$

where $i^{opt}$, $j^{opt}$, $k^{opt}$ correspond respectively to indices of the PMI and the first and second PMIs (from the finite PMI set), I corresponds to an identity matrix, $H_1$ corresponds to the channel estimate from the serving cell, $H_2$ corresponds to the first channel estimate from the first interfering cell, $H_3$ corresponds to the second channel estimate from the second interfering cell, $W_i$ corresponds to the PMI for the serving cell, $W_j$ corresponds to the first PMI, $W_k$ corresponds to the second PMI, and det( ) denotes a matrix determinant operation.

In another embodiment, the interference management module repeats step 504 for different hypotheses of serving cell and first and second interfering cells and selects the hypothesis (and PMIs) that results in maximum throughput for signaling to the network. This can include selecting the serving cell and the first and second interfering from multiple available cells. If the hypothesis that results in the maximum throughput includes any interfering cell as the serving cell, then UE 200 can request from the network to switch its serving cell according to the hypothesis.

Process 500 terminates in step 506, which includes signaling the first and second PMIs to a network entity. In an embodiment, the first and second PMIs are signaled on an uplink control channel to one of the available cells (e.g., the serving cell). In an embodiment, step 506 is performed by antennas 202*a-b*.

Figure 6:
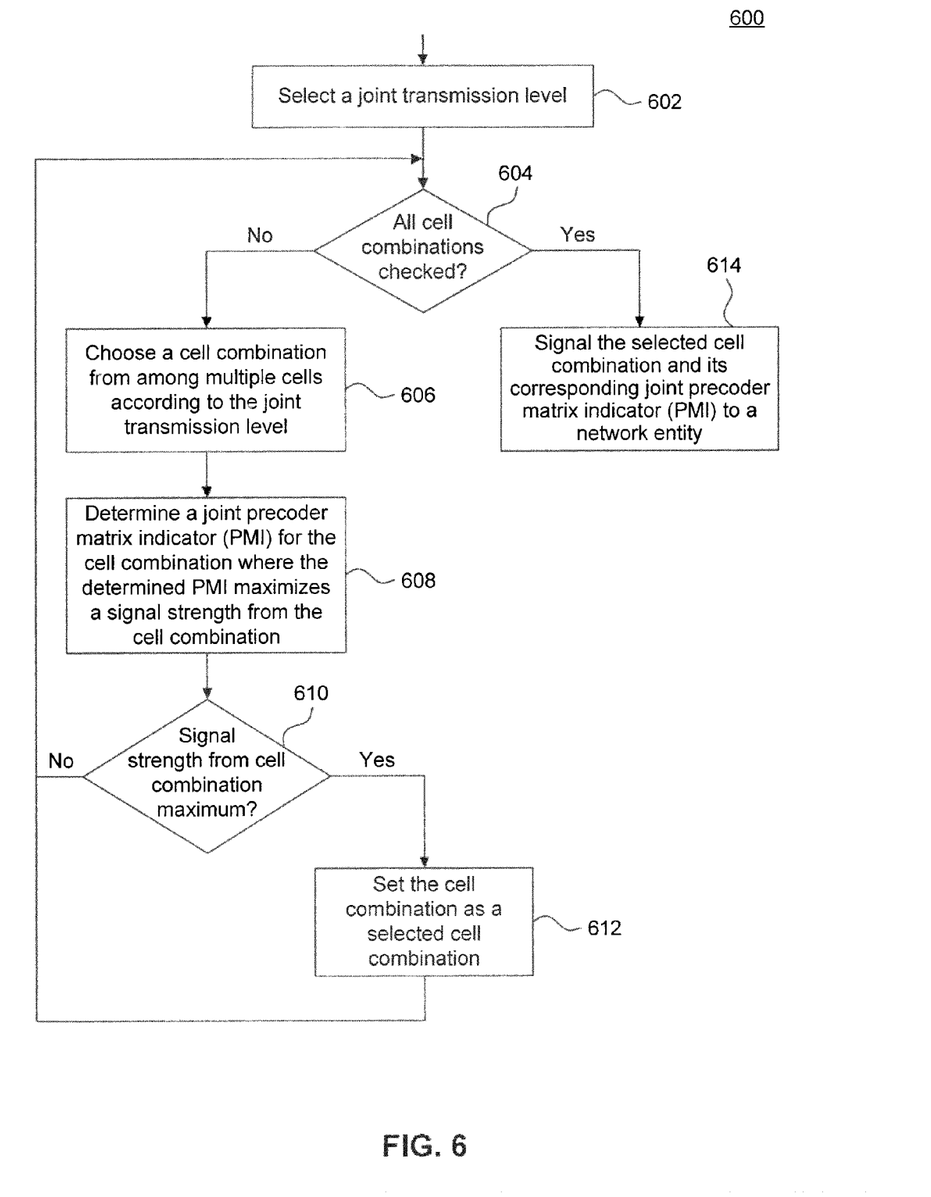

FIG. 6 illustrates an example process 600 for enabling joint transmission from a plurality of cells to UE 200. Example process 600 again exploits the fact that the UE is better equipped than the network to estimate the downlink channels from the serving cell and any present interfering cells, and as such can determine better downlink transmission precoders than the network to enable joint transmission. Example process 600 also avoids having the UE signal the downlink channel estimates to the network, which can result in a large signaling overhead.

As shown in FIG. 6, process 600 begins in step 602, which includes selecting a joint transmission level. The joint transmission level determines a number of cells (e.g., 2, 3, etc.) of multiple available cells to participate in the joint transmission to the UE. In an embodiment, step 602 is performed by an interference management module, such as interference management module 218.

Subsequently, process 600 proceeds to step 604, which includes determining whether all cell combinations have been checked. If the answer is no, process 600 proceeds to step 606, which includes choosing a (previously unchecked) cell combination from among the multiple available cells according to the selected joint transmission level. Then, process 600 proceeds to step 608, which includes determining a joint PMI for the cell combination, where the joint PMI maximizes a signal strength of a joint transmission from the cell combination. Subsequently, step 610 includes determining whether the signal strength associated with the cell combination corresponds to a maximum signal strength over all cell combinations checked thus far. If the answer is no, process 600 returns to step 604. Otherwise, process 600 proceeds to step 612, which includes setting the cell combination as a selected cell combination, and then returns to step 604. In an embodiment, steps 606, 608, 610, and 612 are performed by an interference management module, such as interference management module 218.

In another embodiment, the selected joint transmission level is equal to 2 and the selected cell combination includes first and second cells of the multiple available cells. In an embodiment, the interference management module is configured to select the cell combination and the joint PMI according to:

$$(i^{opt}, j^{opt}, k^{opt}) = \arg\max_{i,j,k} \|[H_i \ H_j]W_k\|^2 \quad (7)$$

where $i^{opt}$ and $j^{opt}$ correspond respectively to indices of the first and second cells, $k^{opt}$ corresponds to an index of the joint PMI from a finite PMI set, $H_i$ corresponds to a first channel estimate from the first cell, $H_j$ corresponds to a second channel estimate from the second cell, and $W_k$ corresponds to the joint PMI.

Returning to step 604, if all cell combinations have been checked, process 600 proceeds to step 614, which includes signaling the selected cell combination and its corresponding joint PMI to a network entity. In an embodiment, step 614 is performed by antennas 202*a-b* of UE 200.

Figure 7:
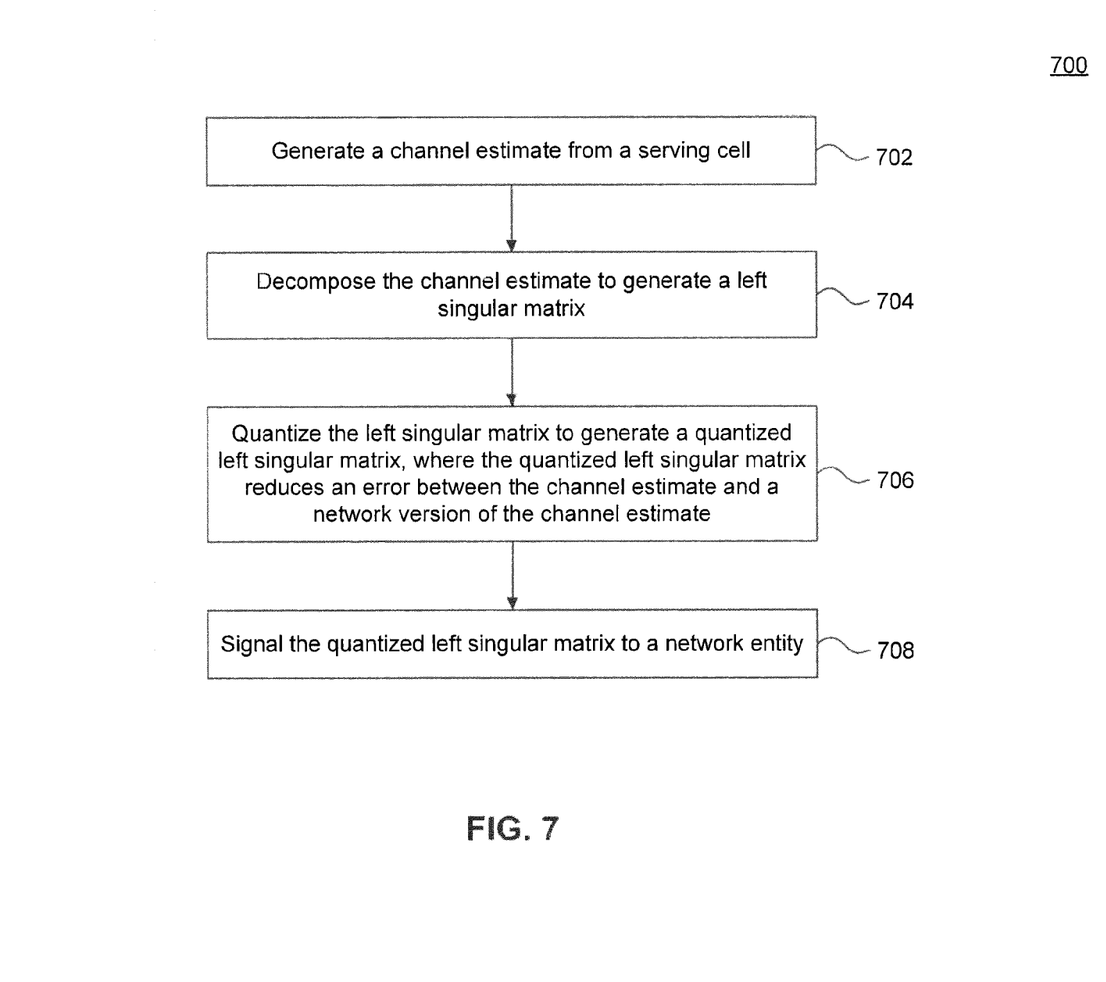

FIG. 7 illustrates an example process 700 for feedback signaling of receive directions from a UE to a network entity according to an embodiment. For the purpose of illustration only, example process 700 is described with reference to the serving cell of the UE. However, as further described below, process 700 can be used for any available cell, including an interfering cell, for example.

Example process 700 recognizes that the network typically has or can estimate all the information necessary to determine a precoder (e.g., optimal precoder) for a serving cell (and/or an interfering cell) (e.g., to achieve interference alignment, interference avoidance, or joint transmission at the UE), except for the receive directions provided by the channel from the serving cell (and/or an interfering cell) to the UE. Example process 700 further recognizes that the receive directions are readily available at the UE and can be given by the principal columns of a left singular matrix, which can be obtained by decomposing (e.g., singular value decomposing) an estimate H of the channel into a product UDV*, where U denotes the left singular matrix, D denotes a diagonal matrix, and V* denotes the conjugate of a right singular matrix of H. Recognizing further that the network can compute good approximations of D and V* from Channel Quality Indicator (CQI) reports from the UE, example process 700 enables efficient signaling of the receive directions from the UE to the network, so that the network can re-construct an estimate of the downlink channel H and compute an appropriate precoder for the serving cell (and/or any interfering cell) based on the channel estimate.

As shown in FIG. 7, process 700 begins in step 702, which includes generating a channel estimate from a serving cell. As discussed above, step 702 can be performed by a channel estimation module, such as channel estimation module 216.

Subsequently, process 700 proceeds to step 704, which includes decomposing the channel estimate to generate a left singular matrix. In an embodiment, step 704 is performed by an interference management module, such as interference management module 218. In an embodiment, the interference management module performs a singular value decomposition (SVD) of the channel estimate to generate the left singular matrix.

Then, in step 706, process 700 includes quantizing the left singular matrix to generate a quantized left singular matrix. In an embodiment, the quantized left singular matrix is a compressed form of the left singular matrix and can be signaled to the network with much lower overhead than the original left singular matrix. In another embodiment, the quantized left singular matrix reduces an error between the channel estimate and a network version of the channel estimate (a channel estimate constructed at the network side).

In an embodiment, the interference management module is configured to generate the quantized left singular matrix according to:

$$U^{opt} = \underset{U \in C}{\arg\min} \|H - U^*SNR(cqi) * V^*\| \quad (8)$$

where $U^{opt}$ corresponds to the quantized left singular matrix, C corresponds to a set of possible left singular matrix quantizations of the left singular matrix, U corresponds to a left singular matrix quantization from the set C, H corresponds to the channel estimate at the UE, SNR(CQI) corresponds to an estimate of signal-to-noise ratio (SNR) at the UE, and V corresponds to a right singular matrix of the channel estimate. Note that in equation (8), the term U*SNR(cqi)*V* corresponds to the network version of the channel estimate, which can be constructed by the network based on the quantized left singular matrix signaled by the UE and approximations of the matrices D and V*. Equation (8) thus selects the quantization of U from the set of possible quantizations to reduce or minimize the difference between the channel estimate at the UE and the channel estimate that would be constructed by the network.

Process 700 terminates in step 708, which includes signaling the quantized left singular matrix to a network entity. In an embodiment, step 614 is performed by antennas 202a-b of UE 200. The network can construct a channel estimate as described above using the quantized left singular matrix and then determine the appropriate precoder for the serving cell (and/or an interfering cell) to enable interference management at the UE.

Figure 8:
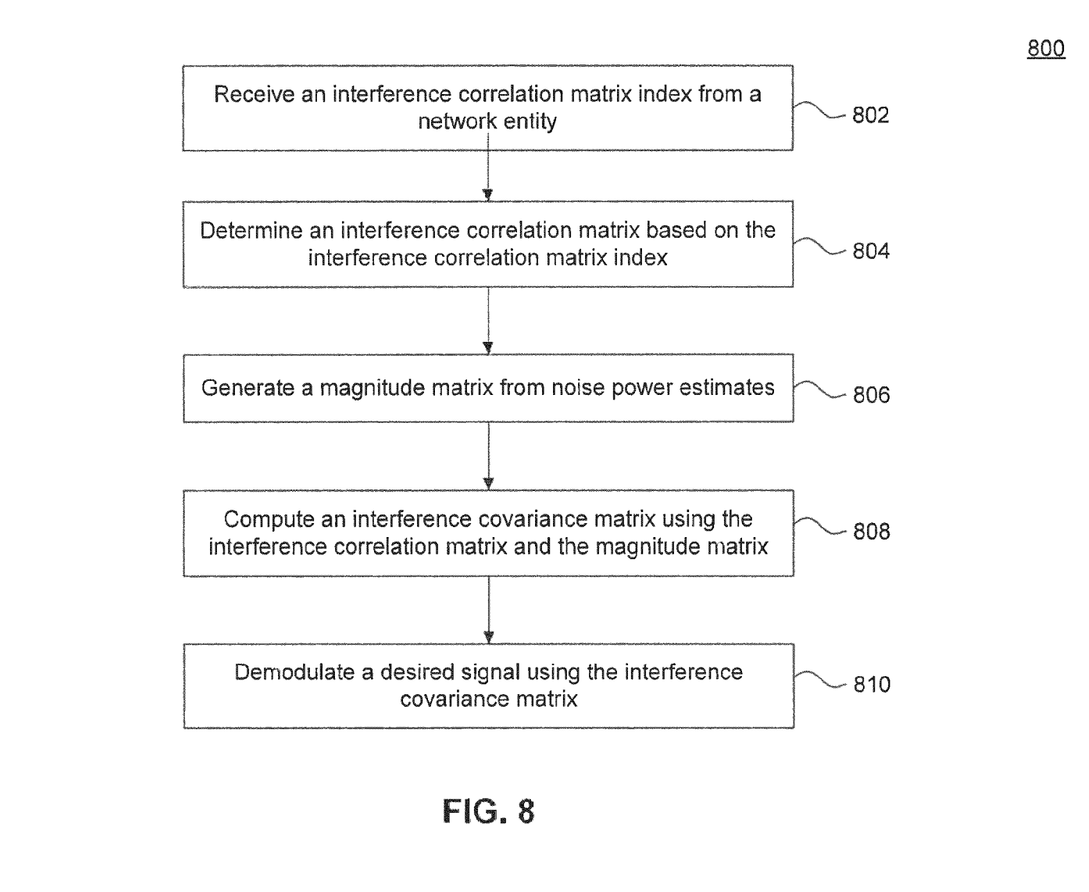

FIG. 8 illustrates an example process 800 for interference management at a UE based on feedforward signaling of interference covariance information from a network entity. As described above, the UE can perform interference suppression with knowledge of the interference covariance matrix Q. However, typically, the UE does not know the interference covariance matrix and cannot estimate it with good accuracy, and signaling the interference covariance matrix to the UE can consume significant resources. Example process 800 recognizes that the covariance interference matrix can be decomposed as $Q=M^{1/2}QM^{1/2}$ where M is a magnitude matrix (contains noise power estimates on the diagonal) and C is an interference correlation matrix. Example process 800 further recognizes that the magnitude matrix M can be estimated at the UE with reasonable accuracy, and that the UE can construct an interference covariance matrix estimate as $\hat{Q}=\hat{M}^{1/2}C\hat{M}^{1/2}$, where $\hat{M}$ is the UE's estimate of the magnitude matrix. Signaling of the interference correlation matrix (or a quantization thereof) from the network is therefore all that the UE needs to generate the interference covariance matrix estimate. By sharing a codebook for the interference correlation matrix between the network and the UE, and by further exploiting knowledge of the physical antenna structure of the UE (when known at the network), the interference correlation matrix can be signaled to the UE with as low as a single bit in some embodiments as further described below.

As shown in FIG. 8, process 800 begins in step 802, which includes receiving an interference correlation matrix index from a network entity. In an embodiment, the interference correlation matrix index includes one or more bits that indicate an interference correlation matrix from a finite set of interference correlation matrices. The finite set of interference correlation matrices can be represented by a codebook, which as further described below can be reduced in size by exploiting the knowledge of the antenna structure of the UE. In an embodiment, the network signals the interference correlation matrix index that corresponds to the interference correlation matrix quantization that is closest to the actual interference correlation matrix.

In an embodiment, for a UE with two receive antennas, the interference correlation matrix C is given by:

$$C = \begin{bmatrix} 1 & \rho \\ \rho^* & 1 \end{bmatrix} = \begin{bmatrix} 1 & |\rho|e^{j\theta} \\ |\rho|e^{-j\theta} & 1 \end{bmatrix} \quad (9)$$

where $\rho$ is a complex correlation coefficient number. In some cases, the UE can reliably estimate the magnitude $|\rho|$ of $\rho$, and thus in an embodiment the network only signals a phase $\theta$ of $\rho$ in order to convey the interference correlation matrix C to the UE. In another embodiment, the correlation matrix C can have $(N^2-N)/2$ unique possible complex numbers (with magnitude $<=1$), where N is the number of receive antennas. As such, the possible complex numbers are quantized, and the interference correlation matrix index signals one quantization from the quantized complex numbers.

In another embodiment, for a UE with more than two antennas, compression of the codebook can be achieved by exploiting the physical structure of the antennas at the UE. For example, for a Uniform Linear Array (ULA) antenna structure, embodiments exploit the fact that the principal receive and transmit directions of the downlink channel to the UE (which are given by the left singular matrix and the right singular matrix respectively of the channel) can be closely approximated by a Discrete Fourier Transform (DFT) vector as follows:

$$v_{ULA}(\theta) = \begin{bmatrix} 1 \\ e^{-j\theta} \\ \vdots \\ e^{-j(N-1)\theta} \end{bmatrix} \quad (10)$$

where $\theta$ represents a phase angle, and N represents the number of antennas. In other words, the received signals across the antennas are only phase shifted by $\theta$ relative to each other. For cross-polarized antenna structures, there is additionally a phase difference across polarization, and the eigenmode of the channel component within the polarization can be approximated by a DFT vector and has the following structure:

$$v_{XPOL}(\theta, c) = \begin{bmatrix} v_{ULA}(\theta) \\ cv_{ULA}(\theta) \end{bmatrix} \quad (11)$$

Thus, the interference correlation matrix can be signaled to the UE by signaling only the phase angle θ for a ULA antenna structure and by signaling θ and c for a cross-polarized antenna structure.

In an embodiment, the interference correlation matrix index is selected by the network from a codebook table, as illustrated by Table 1 below, for example. As shown in Table 1, for each index value, the codebook specifies a corresponding interference management approach to be used by the UE. In some cases, the interference management approach specifies an interference correlation matrix to be applied by the UE. For example, index value 1 provides that the UE uses its own interference management implementation (without relying on network assistance) and to further turn off noise correlation estimation. The network may signal index value 1 to the UE when the actual interference covariance matrix is not sufficiently close to any quantization (of the interference covariance matrix) available at the UE, such that the UE's accounting for noise estimation can degrade the UE's performance. Index value 3 indicates to the UE to use an interference correlation matrix for cross-polarized antenna structures (which corresponds to the physical antenna structure of the UE), which is indexed by the value 1. The UE can retrieve the interference correlation matrix corresponding to the signaled index from a memory and apply it in demodulation.

TABLE 1

| Index | Covariance Method |
|---|---|
| 1 | UE Implementation, Turn off Noise Correlation |
| 2 | UE Implementation, Turn on Noise Correlation |
| 3 | Cross Polarized Structure 1 |
| 4 | Cross Polarized Structure 2 |
| . | . |
| . | . |
| . | . |
|  | Cross Polarized Structure n |
|  | ULA Structure 1 |
|  | ULA Structure 2 |
|  | . |
|  | . |
|  | . |
|  | ULA Structure n |
|  | Hybrid Structure 1 |
|  | Hybrid Structure 2 |
|  | . |
|  | . |
|  | . |
|  | Hybrid Structure n |

As would be understood by a person of skill in the art, in other embodiments, the signaling of the interference correlation matrix index from the network to the UE can be further compressed by first signaling the physical antenna structure and subsequently signaling only an index from a compressed codebook dedicated for the signaled physical antenna structure.

In another embodiment, instead of signaling the interference correlation matrix, the network can signal a receive combining method and/or receiver combining coefficients to the UE. An example codebook according to this embodiment is given by Table 2 below. Similar to Table 1, Table 2 provides a fallback option, indexed by index value 1, in which the UE is instructed to determine its own receive combiner. Additionally, Table 2 includes entries in which the UE can be instructed to compute its receive combiner based on CSI-RS (Channel State Information-Reference Signal) measurements, with the UE further provided which CSI-RS resources correspond to interference. Explicit signaling of receive combiners is also enabled by Table 2. As described above with respect to Table 1, receiver combiners based on physical antenna structures can be used.

TABLE 2

| Index | Receive Combining Method |
|---|---|
| 1 | UE Implementation |
| 2 | Based on CSI-RS, CSI-RS Bitmap 1 |
| 3 | Based on CSI-RS, CSI-RS Bitmap |
| . | Based on CSI-RS CSI-RS Bitmap n |
| . |  |
| . |  |
| . | Receive Combiner 1 |
| . |  |
| . | Receive Combiner 2 |
| . | . |
| . | . |
| . | . |
| . | Receive Combiner n |
| . |  |

Returning to FIG. 8, after step 802, process 800 proceeds to step 804, which includes determining an interference correlation matrix based on the interference correlation matrix index. As described above, the UE can retrieve the interference correlation matrix corresponding to the signaled index from a memory. Subsequently, in step 806, process 800 includes generating a magnitude matrix from noise power estimates. In an embodiment, the magnitude matrix corresponds to the matrix $\hat{M}$, described above, which the UE can estimate with good accuracy from noise power estimates. Process 800 then proceeds to step 808, which includes computing an interference covariance matrix using the interference correlation matrix and the magnitude matrix. In an embodiment, the interference covariance matrix is computed as $\hat{Q}=\hat{M}^{1/2}C\hat{M}^{1/2}$, where C is the interference correlation matrix determined in step 804. In an embodiment, steps 802-808 are performed by an interference management module, such as interference management module 218, for example.

With the interference covariance matrix computed in step 808, process 800 terminates in step 810, which includes demodulating a desired signal using the interference covariance matrix. In an embodiment, step 810 is performed by a demodulator, such as demodulator 220.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A user equipment (UE), comprising:
a channel estimation module configured to generate first and second channel estimates from first and second interfering cells;
an interference management module configured to compute first and second precoder matrix indicators (PMIs) for the first and second interfering cells respectively based on measures of alignment, calculated using the first and second channel estimates, between first and second interfering signals as received by the UE from the first and second interfering cells using different PMI combinations selected from a finite set of PMIs; and
one or more antennas configured to signal the first and second PMIs to a network entity,
wherein the channel estimation module and the interference management module are implemented, at least in part, by one or more processors,
wherein the interference management module is further configured to select the first and second interfering cells from multiple available cells, and
wherein the interference management module is further configured to compute the first and second PMIs according to:

$$(i^{opt}, j^{opt}) = \arg\max_{i,j} \left\{ \frac{H_2 W_i}{\|H_2 W_i\|}, \frac{H_3 W_j}{\|H_3 W_j\|} \right\}$$

where $i^{opt}$ and $j^{opt}$ correspond respectively to indices of the first and second PMIs, $H_2$ corresponds to the first channel estimate from the first interfering cell, $H_3$ corresponds to the second channel estimate from the second interfering cell, $W_i$ corresponds to the first PMI, $W_j$ corresponds to the second PMI, and $\langle\ \rangle$ denotes a dot-product operation.

2. The UE of claim 1, wherein the interference management module is further configured to select a serving cell of the UE and the first and second interfering cells from the multiple available cells.

3. The UE of claim 2, wherein the interference management module is further configured to select the serving cell and the first and second interfering cells to increase a data throughput to the UE.

4. The UE of claim 2, wherein the interference management module is further configured to compute a PMI for the serving cell and the first and second PMIs according to:

$$(i^{opt}, j^{opt}, k^{opt}) = \arg\max_{i,j,k} \log\det(I + H_1 W_i W_i^* H_1^* (H_2 W_j W_j^* H_2^* + H_3 W_k W_k^* H_3^* + I)^{-1})$$

where $i^{opt}$, $j^{opt}$, $k^{opt}$ correspond respectively to indices of the PMI and the first and second PMIs, I corresponds to an identity matrix, $H_1$ corresponds to a channel estimate from the serving cell, $H_2$ corresponds to the first channel estimate from the first interfering cell, $H_3$ corresponds to the second channel estimate from the second interfering cell, $W_i$ corresponds to the PMI for the serving cell, $W_j$ corresponds to the first PMI, $W_k$ corresponds to the second PMI, and det( ) denotes a matrix determinant operation.

5. The UE of claim 1, wherein the interference management module is further configured to compute at least one of the first and second PMIs to reduce interference from at least one of the first and second interfering cells.

6. The UE of claim 1, further comprising:
a radio frequency integrated circuit (RFIC) configured to filter, down-convert, and digitize the first and second interfering signals.

7. The UE of claim 6, further comprising:
a Fast Fourier Transform (FFT)/Inverse FFT (IFFT) processor, coupled to the RFIC, and configured to further process an output of the RFIC and provide first and second information signals to the interference management module, the first and second information signals representative of the first and second interfering signals, respectively.

8. A user equipment (UE), comprising:
a channel estimation module configured to generate first and second channel estimates from first and second interfering cells;
an interference management module configured to jointly select first and second precoder matrix indicators (PMIs) for the first and second interfering cells respectively based on measures of alignment between first and second interfering signals received from the first and second interfering cells using different PMI combinations selected from a finite set of PMIs, wherein the measures of alignment are determined based on the first and second channel estimates; and
one or more antennas configured to signal the first and second PMIs to a network entity,
wherein the channel estimation module and the interference management module are implemented, at least in part, using one or more processors,
wherein the interference management module is further configured to select the first and second interfering cells from multiple available cells, and
wherein the interference management processor is configured to jointly select the first and second PMIs according to:

$$(i^{opt}, j^{opt}) = \arg\max_{i,j} \left\{ \frac{H_2 W_i}{\|H_2 W_i\|}, \frac{H_3 W_j}{\|H_3 W_j\|} \right\}$$

where $i^{opt}$ and $j^{opt}$ correspond respectively to indices of the first and second PMIs, $H_2$ corresponds to the first channel estimate from the first interfering cell, $H_3$ corresponds to the second channel estimate from the second interfering cell, $W_i$ corresponds to the first PMI, $W_j$ corresponds to the second PMI, and $\langle\ \rangle$ denotes a dot-product operation.

9. The UE of claim 8, wherein the interference management module is further configured to select a serving cell of the UE and the first and second interfering cells from the multiple available cells.

10. The UE of claim 9, wherein the interference management module is further configured to select the serving cell and the first and second interfering cells to increase a data throughput to the UE.

11. The UE of claim 8, wherein the interference management module is further configured to compute at least one of the first and second PMIs to reduce interference from at least one of the first and second interfering cells.

12. The UE of claim 8, further comprising:
a radio frequency integrated circuit (RFIC) configured to filter, down-convert, and digitize the first and second interfering signals.

13. The UE of claim 12, further comprising:
a Fast Fourier Transform (FFT)/Inverse FFT (IFFT) processor, coupled to the RFIC, and configured to further process an output of the RFIC and provide first and second information signals to the interference management module, the first and second information signals representative of the first and second interfering signals, respectively.

14. A method, comprising:
selecting first and second interfering cells from multiple available cells;
generating first and second channel estimates from the first and second interfering cells at a user equipment (UE);
jointly selecting, at the UE, first and second precoder matrix indicators (PMIs) for the first and second interfering cells respectively based on measures of alignment between first and second interfering signals received from the first and second interfering cells using different PMI combinations selected from a finite set of PMIs, wherein the measures of alignment are determined based on the first and second channel estimates; and
signaling the first and second PMIs from the UE to a network entity, wherein the jointly selecting, at the UE, the first and second PMIs further comprises selecting the first and second PMIs according to:

$$(i^{opt}, j^{opt}) = \arg \max_{i,j} \left( \frac{H_2 W_i}{\|H_2 W_i\|}, \frac{H_3 W_j}{\|H_3 W_j\|} \right)$$

where $i^{opt}$ and $j^{opt}$ correspond respectively to indices of the first and second PMIs, $H_2$ corresponds to the first channel estimate from the first interfering cell, $H_3$ corresponds to the second channel estimate from the second interfering cell, $W_i$ corresponds to the first PMI, $W_j$ corresponds to the second PMI, and $\langle\ \rangle$ denotes a dot-product operation.

15. The method of claim 14, further comprising:
selecting a serving cell of the UE and the first and second interfering cells from the multiple available cells.

16. The method of claim 15, wherein selecting the serving cell of the UE and the first and second interfering cells from the multiple available cells further comprises:
selecting the serving cell and the first and second interfering cells to increase a data throughput to the UE.

17. The method of claim 14, further comprising:
computing at least one of the first and second PMIs to reduce interference from at least one of the first and second interfering cells.

18. The method of claim 14, wherein the first and second PMIs are selected from a finite set of PMIs.

19. The method of claim 14, further comprising:
filtering, down-converting, and digitizing the first and second interfering signals to generate first and second baseband signals.

20. The method of claim 19, further comprising:
processing the first, and second baseband signals to generate first and second information signals representative of the first and second interfering signals, respectively.

* * * * *

UNITED STATES PATENT AND TRADEMARK OFFICE
CERTIFICATE OF CORRECTION

PATENT NO. : 10,044,487 B2
APPLICATION NO. : 14/093093
DATED : August 7, 2018
INVENTOR(S) : Gomadam et al.

Page 1 of 1

It is certified that error appears in the above-identified patent and that said Letters Patent is hereby corrected as shown below:

In the Claims

In Column 16, Line 34, replace "processing the first, and second baseband signals" with --processing the first and second baseband signals--.

Signed and Sealed this
Twenty-third Day of April, 2019

Andrei Iancu
*Director of the United States Patent and Trademark Office*